United States Patent Office 3,246,884
Patented Apr. 19, 1966

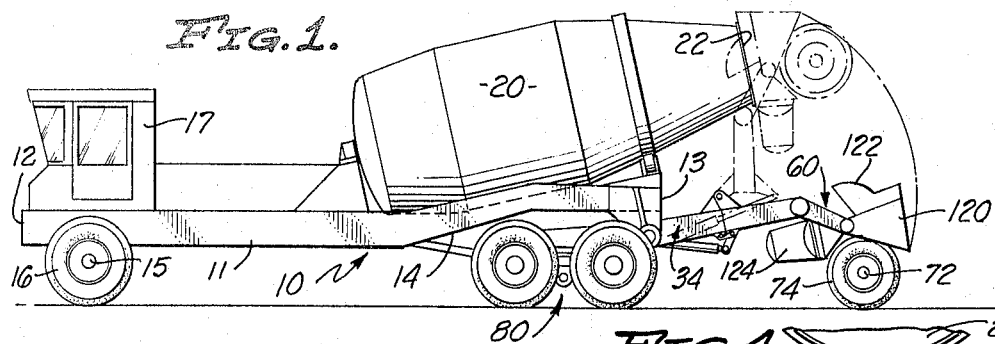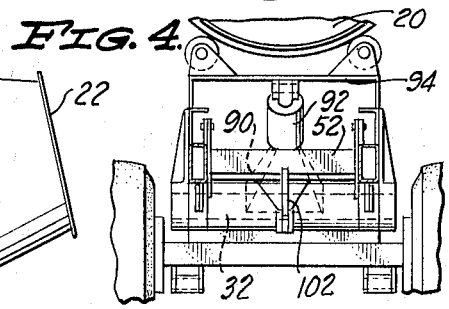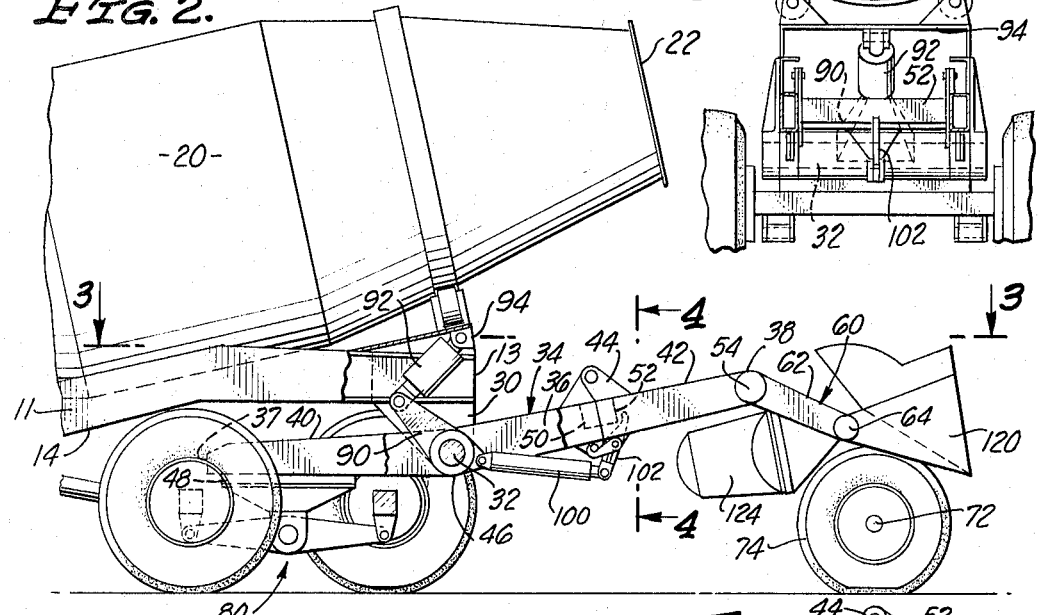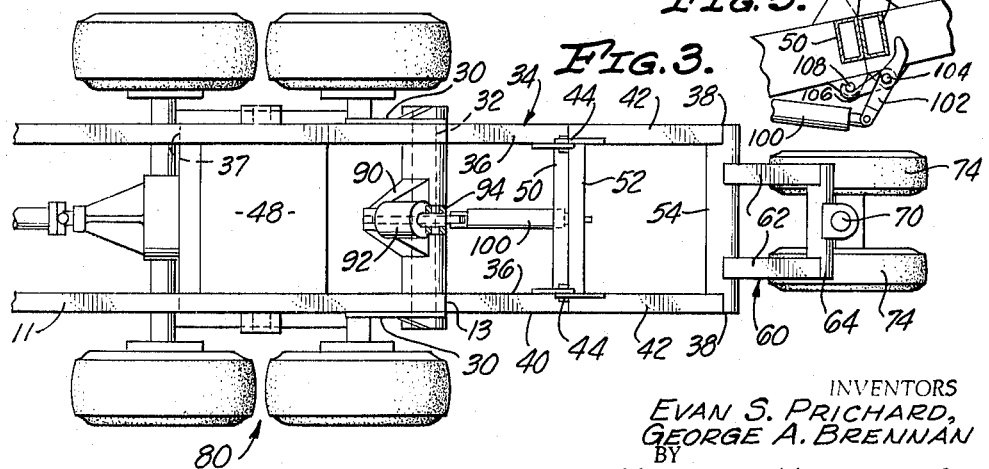

3,246,884
TRANSIT MIXER DOLLY
Evan S. Prichard, Newport Beach, and George A. Brennan, La Mirada, Calif., assignors to Challenge-Cook Bros., Incorporated, Los Angeles, Calif., a corporation of California
Filed Aug. 28, 1964, Ser. No. 392,864
12 Claims. (Cl. 259—161)

This invention relates to a dolly for a transit mixer. More particularly, it relates to a transit mixer having a dolly mounted rearwardly on the truck body frame of the transit mixer and disposed so as to bear a portion of the weight load of aggregate mix carried by the transit mixer, said dolly also supporting loading and discharge mechanisms for a transit mix drum mounted on the truck body frame, the dolly being elevatable to bring the loading and discharge mechanisms into operative position adjacent the open end of the drum.

In the transit mix industry it is well known that, due principally to motor vehicle highway regulations, the carrying capacity of transit mixers is restricted, and pay-load is consequently limited. The highway regulations limit the axle weight-load of a transit mix truck so that, for example, certain of the State highway departments limit the pay-load of aggregate mix which may be carried on highway in a transit mix truck to seven and one-half yards, because seven and one-half yards of aggregate mix produces maximum allowable axle weight loads.

Various methods have been devised to provide greater pay-load capacities for transit mixer trucks. For instance, fluid power means have been mounted on truck body frames and disposed so as to exert power rearwardly and downwardly on trailing vehicles so as to distribute a portion of the weight load from the truck axles to an axle on the trailing vehicle, thus permitting large pay-loads, the weight of which is distributed over a longer over-all wheel base and an increased number of axles, but many of the methods utilized have been elaborate and complicated.

It is, therefore, an object of the present invention to provide a simplified device which will give improved weight load distribution and will comply with highway restrictions, so that greater pay-loads may be carried by transit mixers on highways.

It is another object of the invention to provide a wheeled dolly which, in transit along a highway is lowered in trailing position so as to bear a portion of the weight load, but will not interfere with the normal turning radius characteristics of the truck on which it is mounted.

It is still another object of the invention to provide such a dolly which, when extended in transit position, achieves part of its weight-load bearing functions by supporting loading and discharge mechanisms mounted thereon, and which is elevatable, when desired, to bring the loading and discharge mechanisms into operative position adjacent the elevated open loading and discharge end of the transit mixer drum.

It is yet another object of the invention to provide a dolly which is elevatable so as to remove its ground-contacting wheels from the ground so as to permit free operation of the truck in reverse.

With these and other objects in view, the invention consists of the construction, arrangement, and combination of the various elements of the device whereby the objects contemplated are attained, as hereinafter set forth, pointed out in the appended claims, and illustrated in the accompanying drawings, in which:

FIG. 1 is a side elevational view of a transit mixer equipped with the dolly of the present invention, the dolly being shown in solid lines in its transit position and in dotted lines in its fully elevated position;

FIG. 2 is an enlarged, fragmentary side elevational view of the rear end of the truck and the dolly shown in FIG. 1;
FIG. 3 is a view taken on line 3—3 of FIG. 2;
FIG. 4 is a view taken on line 4—4 of FIG. 2; and
FIG. 5 is an enlarged, fragmentary view of the breakaway section of the frame of the dolly.

Referring first to FIG. 1 of the drawings, there is shown a truck, generally designated 10, which has a truck body frame 11, in turn having a forward end 12 and a rear end 13. The truck body frame 11 is preferably goose-necked upwardly, as at 14, adjacent the rear end 13 thereof, in order to accommodate the dolly of the present invention. Mounted on the truck body frame 11 adjacent the forward end 12 thereof, is a steerable axle 15 on which ground-contacting wheels 16 are mounted. Also mounted on the truck body frame 11 adjacent the forward end 12 is an operator's cab 17.

Rotatably mounted on the truck body frame 11 is a mixer drum 20, the longitudinal axis of which is inclined upwardly, rearwardly. An open loading and discharge end 22 of the drum 20 is thus disposed in elevated position, rearwardly of the rear end 13 of the truck body frame 11.

Stanchions 30, best shown in FIGS. 2 and 3, are mounted on and depend from opposite sides of the truck body frame 11 adjacent the rear end 13 of the truck body frame 11, and transversely disposed between and mounted on the stanchions 30 is a rotatable rod 32.

An open-framed dolly, generally designated 34, has parallel side members 36 which are split intermediate their front ends 37 and their rear ends 38 so as to define a forward or front dolly section 40 and a rear dolly section 42. The front dolly section 40 and the rear dolly section 42 are joined by a hinge 44, the purpose of the hinge 44 being to permit the elevation of the rear dolly section 42 in the manner hereinafter described.

The side members 36 of the dolly 34 are preferably bent upwardly at an angle intermediate the end of the front dolly section 40, as at 46, as best shown in FIG. 2. The side members 36 are mounted on the rod 32 adjacent opposite sides of the truck body frame 11 and intermediate the ends of the front dolly section 40, preferably at the point 46, so that the forward portion of the front dolly section 40 is disposed below the rear end 13 of the truck body frame 11, with its side members 36 substantially parallel to the sides of the truck body frame 11, while the rear portion of the front dolly section 40 extends rearwardly and upwardly beyond the rear end 13 of the truck body frame 11. If desired, a transverse frame member 48 may join the front ends of the forward dolly section 40.

A transverse frame member 50 joins the rear ends of the side members 36 of the front dolly section 40, and a transverse frame members 52 joins the forward ends of the side members 36 of the rear dolly section 42. Additionally, a transverse frame member 54 joints the rear ends of the side members 36 of the rear dolly section 42.

A framed dolly extension 60 has parallel side members 62 which are mounted at their forward ends on the transverse frame member 54. Preferably the side members 62 are disposed at a declining angle from the side members 36 of the dolly 34. A transverse frame member 64 joins the rear ends of the side members 62 of the dolly extension 60.

A swivel pin 70 is suitably, centrally mounted on the transverse member 64 and extends vertically downwardly from the transverse member 64. An axle 72 is mounted on the lower end of the pin 70 at susbtantially the center of the axle 72, and a pair of ground-contacting wheels 74 is mounted on the axle 72, the wheels 74 being disposed on opposite sides of the pin 70.

Rear ground-contacting truck wheel assemblies, which may be the tandem rear wheel assemblies 80 shown in the drawings, are mounted adjacent the forward ends 37 of the side members 36 of the dolly 34.

Mounted on the rotatable rod 32, at substantially the center of the rod 32, is a crank arm 90 which inclines forwardly and upwardly from the rod 32, and a reciprocal fluid pressure cylinder and piston rod assembly 92 is pivotally mounted at one end of the assembly 92 to the free end of the crank arm 90. The other end of the assembly 92 is pivotally mounted on a frame structure 94 on the truck body frame 11 upwardly and rearwardly of the free end of the crank arm 90, the assembly 92 being thus disposed so that, upon introduction of fluid pressure into the assembly 92, the piston rod of the assembly 92 will be extended to act upon the crank arm 90, which in turn will act upon the rod 32 and rotate it so as to elevate the dolly 34, or reciprocally to lower the dolly 34, in the manner hereinafter described in more detail.

Also suitably, pivotally mounted on the rod 32, at substantially the center of the rod 32, and preferably below the mounting of the crank arm 90 thereon, is a second reciprocal fluid pressure cylinder and piston rod assembly 100, the free end of which is pivotally mounted on the lower end of a rocker arm 102. The rocker arm 102 is mounted intermediate its ends on a transverse rod 104 disposed adjacent the forward end of the rear dolly section 42 and below the transverse frame member 52, the upper end of the rocker arm 102 being disposed so as to abut on the frame member 52 after intermediate movement upon introduction of fluid pressure into the cylinder and piston rod assembly 100 in the manner hereinafter described.

An arcuate catch 106 is mounted on the rocker arm 102 and disposed so as to engage a transverse rod 108 disposed adjacent the rear end of the front dolly section 40 and below the transverse frame member 50.

Mounted on the dolly extension 60 are a loading hopper 120, a loading chute 122 mounted on the hopper 120, and a discharge accumulator 124, all disposed so as to be placed in operative position adjacent the open end 22 of the drum 20 when the dolly 34 is elevated, as best shown in dotted lines in FIG. 1.

When the transit mixer is in transit along a highway and carrying a load of aggregate mix in the rotating drum 20, the weight load is borne by the forward axle 15 and the front wheels 16, the rear wheel assemblies 80 mounted at the front end of the dolly 34, and the dolly axle 72 and dolly wheels 74, with a substantial part of the weight load thus transferred from the truck 10 to the dolly 34.

When the transit mixer arrives at a job site and the load of aggregate mix in the drum 20 is to be discharged, fluid pressure is introduced into the cylinder and piston rod assembly 92 to extend the piston rod thereof. The extension of the piston rod of the assembly 92 will act upon the crank arm 90 so as to cause the rear end of the dolly 34 to elevate sufficiently to lift the wheels 74 clear of the ground.

Fluid pressure is then introduced into the cylinder and piston rod assembly 100 to extend the piston rod thereof. The extension of the piston rod of the assembly 100 will act upon the rocker arm 102 and cause it to swing in a counter-clockwise direction. Because the arcuate catch 106 is mounted on the rocker arm 102, the catch 106 will be impelled rearwardly so as to free it from its engagement with the rod 108, thus unlocking the engagement of the rear dolly section 42 with the front dolly section 40.

As the extension of the piston rod of the cylinder and piston rod assembly 100 continues, the upper end of the rocker arm 102 will abut on the transverse member 52, and as the piston rod of the cylinder and piston assembly 100 is further extended, the rear dolly section 42 will swing on the hinge 44 and be elevated until the discharge accumulator 124 is positioned adjacent to and below the open end 22 of the drum 20, whereupon the activation of the cylinder and piston rod assembly 100 is discontinued, and discharge of the aggregate cargo in the drum 20 is accomplished by reversing the direction of rotation of the drum 20, in a manner well known in the transit mix industry.

When cargo discharge has been accomplished, the direction of fluid pressure application in the cylinder and piston rod assembly 100 is reversed for reciprocal action, and as the piston rod of the assembly 100 is retracted into the cylinder thereof, the rear dolly section 42 will lower until it is aligned with the front dolly section 40, whereupon the catch 106 will engage the rod 108 and latch the rear dolly section 42 in position.

The direction of fluid pressure application in the cylinder and piston assembly 92 is then reversed for reciprocal action, and as the piston rod of the assembly 92 is retracted into the cylinder thereof, the dolly 34 will be lowered until the dolly wheels 74 again are in contact with the ground and the transit mixer is again in transit disposition.

Similarly, when the transit mixer arrives at a bulk loading plant and the drum 20 is to be charged with another load of aggregate mix, the same elevating steps are accomplished to bring the hopper 120 into loading position under the discharge mechanism of the bulk loading plant, and to position the loading chute 122 within the open end 22 of the drum 20. When charging has been accomplished, the dolly is lowered in the manner hereinabove described, and the transit mixer is again in transit disposition, with weight load distribution accomplished.

Although the invention has been herein shown and described in what is conceived to be the most practical and preferred embodiment thereof, it is recognized that departures may be made therefrom within the scope of the invention, which is not to be limited to the details disclosed herein, but is to be accorded the full scope of the claims so as to embrace any and all equivalent structures and devices.

We claim:

1. A transit mixer which comprises: a truck having a body frame; a mixer drum mounted on the truck body frame, the drum having an open cargo loading and discharge end disposed rearwardly on the truck body frame; a dolly pivotally mounted adjacent the rear end of the truck body frame and extending forwardly of and below the rear end of the truck body frame and rearwardly therefrom; ground-contacting wheels mounted adjacent the forward end of the dolly and below the truck body frame so as to support the dolly and the truck body frame; ground-contacting wheels mounted adjacent the rear end of the dolly; cargo loading and discharge means mounted adjacent the rear end of the dolly; first means for elevating the rear end of the dolly so as to elevate the dolly ground-contacting wheels clear of the ground; and second means for elevating the rear end of the dolly so as to bring the cargo loading and discharge means into operative position adjacent the open loading and discharge end of the drum.

2. A transit mixer which comprises: a truck having a body frame; a mixer drum mounted on the truck body frame, the drum having an open cargo loading and discharge end disposed rearwardly on the truck body frame; a dolly having a forward section and a rear section, the forward section of the dolly being pivotally mounted adjacent the rear end of the truck body frame intermediate the ends of the forward section of the dolly and disposed below the truck body frame, and the rear section of the dolly extending rearwardly of the truck body frame; ground-contacting wheels mounted on the forward section of the dolly and disposed below the truck body frame; ground-contacting wheels mounted on the rear section of the dolly; cargo loading and discharge means mounted on the rear section of the dolly; means for elevating the forward section and the rear section of the dolly as a unit so as to elevate the dolly ground-contacting wheels clear of the ground; and means for elevating the rear section of the dolly so as to bring the cargo loading and discharge means into operative position adjacent the open loading and discharge end of the drum.

3. A transit mixer as defined in claim 2, including a hinge interconnecting the forward section of the dolly and the rear section of the dolly, and including latch means releasably securing the rear section of the dolly to the forward section of the dolly.

4. A transit mixer as defined in claim 3, wherein the means for elevating the forward section and the rear section of the dolly as a unit comprises: a fluid pressure cylinder and piston rod assembly pivotally mounted on the truck body frame and on the forward section of the dolly forwardly of the pivotal connection of the forward section of the dolly to the truck body frame and disposed so as to exert downward pressure on the forward section of the dolly forward of said pivotal connection.

5. A transit mixer as defined in claim 3, wherein the means for elevating the rear section of the dolly comprises: a fluid pressure and piston rod assembly pivotally mounted on the forward section of the dolly and on the rear section of the dolly and disposed so as to release the latch means and swing the rear section of the dolly upwardly on the hinge.

6. A transit mixer comprising a truck having a body frame, a mixer drum mounted on the truck body frame, a dolly pivotally mounted on said truck body frame adjacent the rear end, said dolly having a portion extending forwardly of said pivotal mounting, ground-contacting wheels mounted on said forwardly extending portion, said dolly having a portion extending rearwardly of said pivotal mounting, ground-contacting wheels mounted on said rearwardly extending portion, and means for causing pivoting of said dolly about said pivotal mounting to elevate the said wheels mounted on the rearwardly extending portion clear of the ground.

7. A transit mixer comprising a truck having a body frame, a mixer drum mounted on the truck body frame, a dolly pivotally mounted on said truck body frame at the rear end, said dolly having forward and rear sections extending forwardly and rearwardly respectively of said pivotal mounting, separate ground-contacting wheel means mounted on said forward and rearward sections for supporting said dolly and in turn supporting said truck through said pivotal mounting, and operable means for causing pivoting of said dolly about said pivotal mounting to elevate the said rear section wheel means clear of the ground for supporting said truck and dolly on said forward section wheel means.

8. The transit mixer of claim 7 wherein said rear section mounted ground-contacting wheel means are pivotable about a vertical axis for turning in the manner of a caster during turning of the truck.

9. The transit mixer of claim 7 wherein said forward and rear sections of the dolly are hingedly interconnected and means are provided for selectively pivoting said rear section about said hinge interconnection for elevating said rear section substantially beyond the said elevation caused by pivoting about said pivotal mounting of said dolly on said truck body frame.

10. The transit mixer of claim 7 wherein said pivotal mounting between said dolly and truck body frame is located rearwardly of the ground contact made by the rearmost of the said wheel means mounted on said forward section.

11. The transit mixer of claim 7 wherein the said mixer drum has an open end for cargo loading and discharge and said end extends rearwardly beyond the said rear end of the truck body frame, and means are provided for elevating said rear section mounted wheel means a substantial distance above the ground for permitting the truck to move rearwardly to locations where said mixer drum open end is positioned substantially rearwardly of the point of ground engagement by said forward section mounted wheel means.

12. The transit mixer of claim 11 wherein cargo loading and discharge means are mounted on said rear section of the dolly and are moved into operable communication with said mixer drum open end upon said elevation of the rear section the substantial distance above ground.

References Cited by the Examiner

UNITED STATES PATENTS 3,019,002  1/1962  Prichard _____ 259—169
3,112,100  11/1963  Prichard _____ 259—161

References Cited by the Applicant

FOREIGN PATENTS 114,850  3/1942  Australia.

WALTER A. SCHEEL, *Primary Examiner.*

CHARLES A. WILLMUTH, *Examiner.*